US012582119B2

(12) United States Patent
Farina et al.

(10) Patent No.: US 12,582,119 B2
(45) Date of Patent: Mar. 24, 2026

(54) FORMULATION AND COMPOSITION WHICH PROMOTE TARGETED POLLINATION BY BEES TOWARDS KIWI CROPS AND RELATED METHODS

(71) Applicants: CONSEJO NACIONAL DE INVESTIGACIONES CIENTÍFICAS Y TÉCNICAS (CONICET), Ciudad Autónoma de Buenos Aires (AR); UNIVERSIDAD DE BUENOS AIRES, Ciudad Autónoma de Buenos Aires (AR)

(72) Inventors: Walter Marcelo Farina, Ciudad Autónoma de Buenos Aires (AR); María Cecilia Estravis Barcala, Ciudad Autónoma de Buenos Aires (AR); Florencia Palottini, Ciudad Autónoma de Buenos Aires (AR)

(73) Assignees: CONSEJO NACIONAL DE INVESTIGACIONES CIENTIFICAS Y TECNICAS (CONICET), Buenos Aires (AR); UNIVERSIDAD DE BUENOS AIRES, Buenos Aires (AR)

( * ) Notice: Subject to any disclaimer, the term of this patent is extended or adjusted under 35 U.S.C. 154(b) by 759 days.

(21) Appl. No.: 17/903,871

(22) Filed: Sep. 6, 2022

(65) Prior Publication Data

US 2023/0082298 A1      Mar. 16, 2023

Related U.S. Application Data

(60) Provisional application No. 63/240,476, filed on Sep. 3, 2021.

(51) Int. Cl.
| | |
|---|---|
| *A01N 31/04* | (2006.01) |
| *A01N 27/00* | (2006.01) |
| *A01N 49/00* | (2006.01) |

(52) U.S. Cl.
CPC ............. *A01N 31/04* (2013.01); *A01N 27/00* (2013.01)

(58) Field of Classification Search
CPC ......... A01N 31/04; A01N 27/00; A01N 49/00
See application file for complete search history.

(56) References Cited

FOREIGN PATENT DOCUMENTS

| | | |
|---|---|---|
| CN | 101569286 A | 11/2009 |
| CN | 102823628 A | 12/2012 |
| JP | 2008212148 | 9/2008 |
| WO | WO2013005200 A1 | 1/2013 |
| WO | WO2019021209 A1 | 1/2019 |
| WO | WO2019021210 A1 | 1/2019 |
| WO | WO2019073443 A1 | 4/2019 |

OTHER PUBLICATIONS

Seify, Z. et al., "Essential oil compositon of Rosa damascena Mill. produced with different storage temperatures and durations," Horticultural Science and Technology, vol. 36(4), pp. 552-559 (2018).*
Farina WM, Arenas A, Diaz PC, Susic Martin C, Estravis Barcala MC (2020). *Learning of a mimic odor within honeybee hives improves pollination service efficiency in a commercial crop.* Current Biology, 30, 1-7, 13 pages. https://doi.org/10.1016/j.cub.2020.08.018).

* cited by examiner

*Primary Examiner* — John Pak

(74) *Attorney, Agent, or Firm* — MUNCY, GEISSLER, OLDS & LOWE, P.C.

(57) ABSTRACT

This invention refers to a formulation and a composition that promote the pollination of kiwifruit crops by selectively inducing the pollinating activity of bees. It also refers to a method for targeting the pollinating activity of bees to kiwifruit crops.

13 Claims, 7 Drawing Sheets

FORMULATION AND COMPOSITION WHICH PROMOTE TARGETED POLLINATION BY BEES TOWARDS KIWI CROPS AND RELATED METHODS

CROSS REFERENCE TO RELATED APPLICATIONS

This application claims priority of U.S. Provisional Application No. 63/240,476 filed on Sep. 3, 2021 under 35 U.S.C. § 119(e), the entire contents of all of which are hereby incorporated by reference.

BACKGROUND OF THE INVENTION

Scents play an important role for bees in the selection and discovery of food sources. It is known that bees target the collection of resources not only according to innate search templates, but also according to previous experiences, either gained in the field or within the bee colony (Ribbands C R (1955) The scent language of honeybees; Ann Rev Smithson Inst 368-377; von Frisch K (1967) The dance language and orientation of bees; Harvard University Press, Cambridge, MA). In this regard, the olfactory memories established in the field from floral scents and their nectar can be retrieved (recalled) when said floral scent is present in the beehive (Ribbands C R (1954) Communication between honeybees: the response of crop-attached bees to the scent of their crop; Proc R Entomol Soc Lond A 29:141-144; Johnson D L y Wenner A M (1966) A relationship between conditioning and communication in honeybees: Anim Behav 14:261-265; Jakobsen H B y col. (1995) Can social bees be influenced to choose a specific feeding station by adding the scent of the station to the hive air? J Chem Ecol 21(11):1635-1648; Reinhard J y col., (2004) Floral scents induce recall of navigational and visual memories in honeybees, J Exp Biol 207:4371-4381). In addition, the ingestion of scented food that forager bees introduce into the nest can produce a bias in the collection preferences of nest mates (von Frisch K (1923) Über die Sprache der Bienen; Zool Jb Physiol 40:1-186; Wenner A M y col. (1969) Honey bee recruitment to food sources: olfaction or language? Science 164:84-86; Dornhaus A. Chittka L (1999) Evolutionary origins of bee dances; Nature 401:38).

During collection in scented food sources, hive members may learn their odors when these remain impregnated on the body of the forager bee (von Frisch K (1967) The dance language and orientation of bees; Harvard University) and/or when small samples of scented food are transferred mouth-to-mouth among nest mates (trophallaxis) (Farina, W M y col. (2007) Honeybees learn floral odors while receiving nectar from foragers within the hive; Naturwissenschaften, 94:55-60).

In addition, it has been shown that the scented food introduced by forager bees which circulates inside the hive may affect the behavior of young bees who are still not involved in foraging-related tasks (Grater C y col, (2006) Propagation of olfactory information within the honeybee hive. Behav Ecol Sociobiol 60:707-71; Grüter C y col. (2009), Retention of long-term memories in different age-groups of honeybee (Apis mellifera) workers. Insectes Sociaux, DOI 10.1007/s00040-009-0034-0).

Previously, the inventors hereof have published results indicating that bees may develop olfactory memories inside the hive during the circulation of scented food that may be retrieved (recalled) days later outside the nest, which is evidenced by the bias in foraging preferences. The formation of these memories depends neither on recruitment mechanisms which are common inside the hives, nor on the presence of scented food stores that induce the retrieval of previously acquired memories (Arenas A & col. (2007). Floral odor learning within the hive affects honeybees' foraging decisions. Naturwissenschaften, 94:218-222).

In "Floral odor learning within the hive affects honeybees' foraging decisions", published in Naturwissenschaften, 94:218-222, Arenas A & col., it is also revealed that the food scent offered "inside the hive" generates long-term olfactory memories that affect election behavior in food sources outside the hive. It is also disclosed that, in order to develop long-term memories of a specific (pure) floral odor, the odor must be offered diluted in a sugar solution (50% w/w sucrose solution), which can be offered at a feeder located inside the hive (a common procedure in apiculture). The pure odor must be diluted in the sugar solution in minimum quantities (concentration: 50 µl of odor per liter of sugar solution offered).

In "Floral scents affect the distribution of hive bees around dancers", Behavioral Ecology and Sociobiology (2007) 61:1589-1597, Jul. 4, 2007, Diaz, Paula C. et. al., it is revealed that the floral scent impregnated in the body of a bee returning from a flowering plant attracts their hive mates when following the "bee dance", a mechanism used by this species to recruit other bees to food sources in the hive, in addition to increasing the occurrence of transfers of food samples that take place by means of mouth-to-mouth contacts or trophallaxis.

Finally, in "Floral scents experienced within the colony affect long-term foraging preferences in honeybees". Apidologie 39:714-722, 2008, Arenas A et. al., it is revealed that it is the food scent circulating inside the hive and not that same scent exposed as volatile that increases the number of landings towards the food source with that specific odor. In addition, in "Passive volatile exposure within the honeybee hive and its effect on odor discrimination", Journal of Comparative Physiology A, 195:759-768, 2009, Fernandez V et. al., it is revealed that the floral scent exposed as volatile "within the hive" hinders learning of that floral odor in later trainings. This shows that odors exposed as volatile compounds inside the nest will not be preferred if they are present in a flowering plant of the environment, even if those floral types offer plenty of nectar as a resource.

There are many crops that require to be pollinated by insects, which favor cross-fertilization when visiting different flowers of the same species. Particularly, the Apis mellifera bee is the most abundant monoculture pollinator in the world and it is considered of great importance to increase the yield of fruits and seeds.

In some countries ranking the top positions as honey producers worldwide, such as Argentina, apiculture is essentially conceived to obtain the products stockpiled in the beehive (honey, propolis, royal jelly, etc.). However, the use of the honeybee as a crop pollinating agent is sometimes not as fully developed when compared with the importance it is afforded in countries such as the United States or France. Nevertheless, with the rise of monocultures, there is a growing need of increasing the targeted and sustainable pollination of said plantations.

Targeted pollination poses a significant problem regarding the change in floral availability upon moving the beehives from an environment that is familiar to the forager bees to another one which is novel for them. In the novel environment, the bees lack reliable and updated information that can be evoked during collection.

In practice, it is observed that after transhumance (hive relocation) forager bees remain relatively idle during the first days and fail to visit immediately the flowers to be pollinized, even when these offer a high reward. This occurs given that the recently introduced bees have no previous experiences related to the crop of interest, which is why no previously established memories which may guide or help them find this floral type exist. During a variable period of time (which may span up to several days) bees establish new associations (memories) and update the information that will allow them to find the new floral types that are available in the environment.

There are two products available on the market, POLLI-NUS® and BEE SCENT®, which represent the general profile of a trace pheromone of bees, which is why its presence on flowers attracts new bees. Their use implies spraying the product onto the flowers of the crop (any crop), which can be useful in small surfaces (orchards, gardens) but not in large ones. This practice would require several applications of the product, making it too costly and impractical for extensive crops. Given that these products work straightly as attractants of bees (although they could also attract other insects), they are not specific to any flower type in particular and, due to their nature, they could interfere directly with other bee behaviors. None of these products is based on floral odors associated with the appetitive context, nor do they involve the olfactory memory of bees.

Patent application CN102823628 (A) discloses a composition for attracting bees to a soy crop and a method of use thereof, wherein the attractant composition is sprayed onto the soy crop whose pollination is sought to be improved in order to increase production.

One alternative strategy is to "train" the bees so that they prefer to collect pollen from the specific type of flowers whose pollination is sought. This strategy had already been applied in the thirties by beekeepers from the former USSR and Germany, who used this methodology to stimulate the hives with natural fragrances, particularly crushed flowers [(von Frisch, K. (1943), *Versuche über die Lenkung des Bienenfluges durch Duftstoffe*. Naturwissenschaften 31, 445-460]. The disadvantage of this methodology is that the production at an industrial scale of fragrances produced in such a way is inefficient, and it also entails the destruction precisely of flowers of the species whose pollination is sought to be improved. Even more, the fragrances produced by crushed flowers are unstable and do not resist storage properly.

Patent AR082846B1 discloses that it is possible to train honeybees to the sunflower crop by offering scented food within the hive with a synthetic formulation which bees cannot discriminate from the natural fragrance of the sunflower inflorescence (Farina W M, Arenas A, Diaz P C, Susic Martin C, Estravis Barcala M C (2020). Learning of a mimic odor within honeybee hives improves pollination service efficiency in a commercial crop. Current Biology, 30, 1-7. doi.org/10.1016/j.cub.2020.08.018). The composition comprises the compounds sabinene, beta-pinene and limonene. As it is specific for sunflower crops, said composition, is not useful for promoting the pollination of kiwifruit crops.

Patent application CN101569286 (A) discloses compositions and methods for inducing bees to pollinate sterile plant parental lines, wherein the composition comprises secondary metabolites of flowers, such as common alkaloids (e.g. nicotine and caffeine) and water-soluble phenols (e.g. flavonoids, quercetin, gallic acid and caffeic acid). The method consists in introducing the hives inside tents where the plants whose seed is sought to be produced grow, feeding the composition comprising the secondary metabolites to the bees in a specific schedule and continuing such feeding until the end of bloom, and later removing the bees from the tent. This method and composition are directed to no plant species in particular.

In patent application JP2008212148 "*Method for promoting pollination of plant including induction of flower bee to floral organ of specific plant by taking advantage of floral fragrance component of flower organ of this plant*," a composition of floral fragrances for promoting plant pollination by bees is described. However, in said patent application no composition that mimics in an specific way the fragrance of the kiwifruit flower and which is useful to target bees' pollination activity towards kiwifruit crops is described. A composition of this kind cannot be deduced either from that which is disclosed in patent application JP2008212148.

Patent application WO2019073443A1 discloses a composition to attract pollinator insects comprising compounds present in honey, particularly isophorone and 4-oxoisophorone. The composition is especially useful to attract bumblebees. Although the application mentions the possibility of using the composition in kiwifruit crops, such composition neither is specific to those crops, nor does it comprise compounds present in kiwifruit flowers.

In patent application WO2013005200 (A1) a composition that promotes the pollination of apple crops (*Malus silvestris*) by biasing the honeybees' foraging preferences is disclosed, as well as a method of use thereof. The composition comprises the citral, benzaldehyde and limonene compounds. As it is specific to apple crops, said composition, is not useful to promote the pollination of kiwifruit crops.

In patent application WO2019021209 (A1) a composition that promotes the pollination of almond tree crops (*Prunus dulcis*) by biasing the honeybees' foraging preferences is disclosed, as well as a method of use thereof. The composition comprises the compounds limonene, linalool and benzaldehyde. As it is specific to almond crops, said composition is not useful to promote the pollination of kiwifruit crops.

In patent application WO2019021210 (A1), a composition that promotes the pollination of pear crops (*Pyrus*) by biasing the honeybees' foraging preferences is disclosed. The composition comprises the compounds limonene, linalool, and alpha-pinene. As it is specific to pear crops, said composition is not useful to promote the pollination of kiwifruit crops.

According to several authors, kiwifruit flowers are not attractive to bees due to their lack of nectar, which could affect the crop pollinating capability of the insect (Testolin et al. (1991). *Kiwifruit pollination by wind and insects in Italy*. New Zealand. Journal of Crop and Horticultural Science, 19:4, 381-384).

In addition, there is evidence showing that the nutritional status of honeybees is affected when they pollinate kiwifruit crops (Jay et al. (1993). *The effect of kiwifruit (Actinidia deliciosa A Chev) and yellow flowered broom (Cytisus scoparius Link) pollen on the ovary development of worker honeybees (Apis mellifera L)*. Apidologie 24, p557-563.)

Therefore, there is a need for compositions for promoting the pollination of kiwifruit crops which are effective and stable, whose production at an industrial scale is simple and economical, and which avoid impairing the nutritional status of bees, as well as for also for methods for promoting the pollination of kiwifruit crops by honeybees (*Apis mellifera*) and other pollinators.

BRIEF DESCRIPTION OF THE INVENTION

It is therefore an object of this invention to provide compositions that simulate the floral scent of kiwifruit in order to generate specific olfactory memories in bees from hives that will be moved to kiwifruit crops and used to favor their pollination. Memories established through stimulation with the formulation allow to increase the bees' collecting activity. The composition of the invention stimulates pollination, thereby achieving a significant increase in kiwifruit crop yields. By using the invention, both the permanence time of hives in the crop and the number of hives used can be reduced. Additionally, the use of the composition improves the nutritional state and increases the population of beehives. On the other hand, the cost of the composition is very low and does not require any sophisticated technique for administration.

According to a first aspect, the present invention provides a formulation that promotes targeted pollination by honeybees towards kiwifruit crops, which comprises the compounds farnesene, 1-heptadecene and 2-phenylethanol.

According to another aspect, the present invention provides a composition that promotes the targeted pollination by honeybees towards kiwifruit crops, which comprises the formulation of the invention diluted in a sugar solution.

According to yet another aspect, the present invention provides a method for promoting targeted pollination by honeybees towards kiwifruit crops, which comprises the steps of:

a) administering the composition of the invention to the beehives;

b) keeping the beehives within or in the immediate vicinity of the kiwifruit crop whose pollination is sought to be promoted until the end of the flowering; and c) removing the beehives.

DETAILED DESCRIPTION OF THE INVENTION

Figure 1:
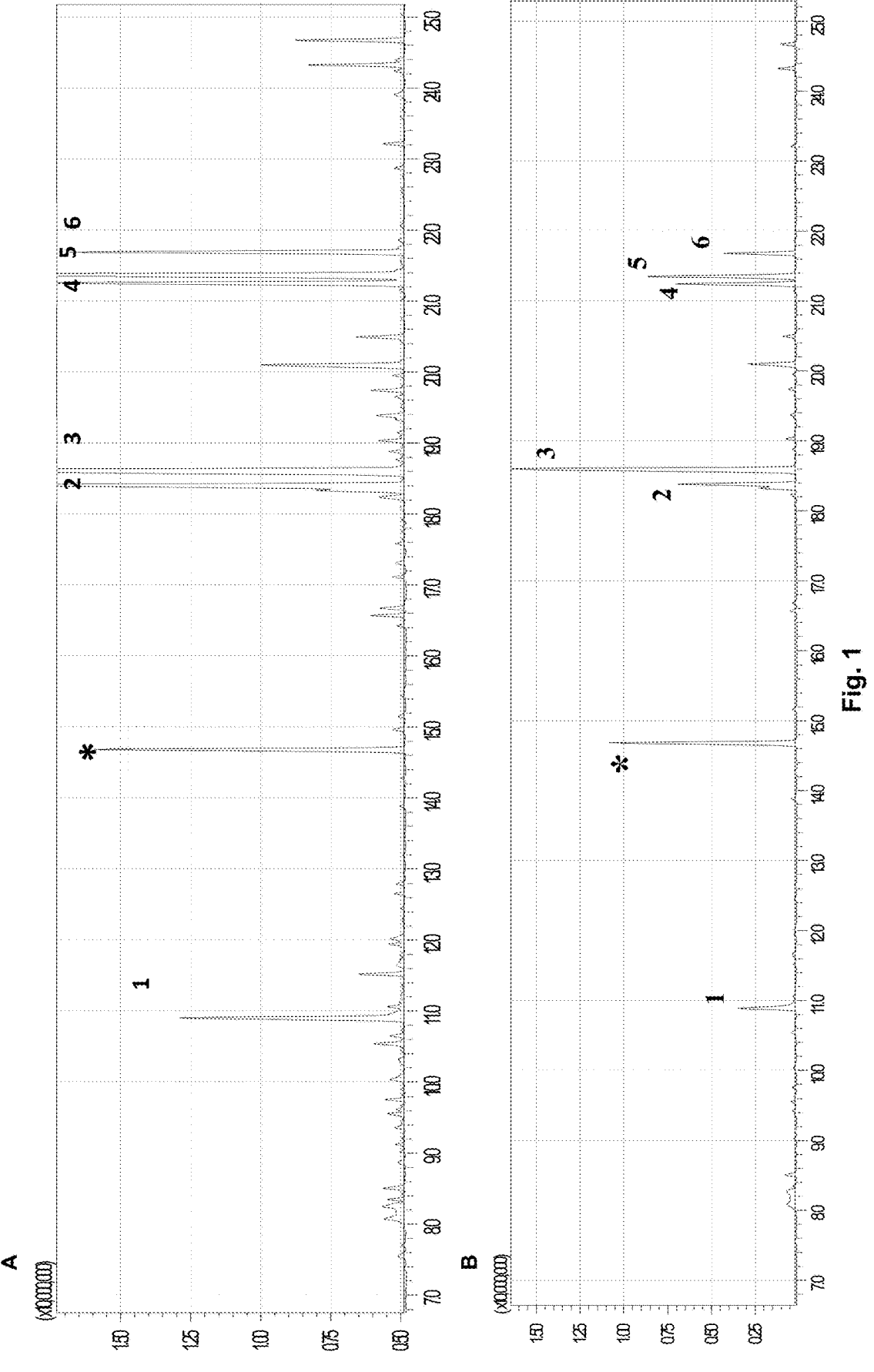
FIG. 1. Chromatographic profile of volatile compounds present in the kiwifruit flower (*A. deliciosa*), identified through GC-MS. A: Male flower; B: Female flower. The major compounds are: 1. phenylethanol, 2: pentadecane, 3: α-farnesene, 4: heptadecadiene, 5: 8-heptadecene, 6: eicosane/heptadecane/heneicosane/hexadecane, *:tridecane (internal standard).
Figure 2:
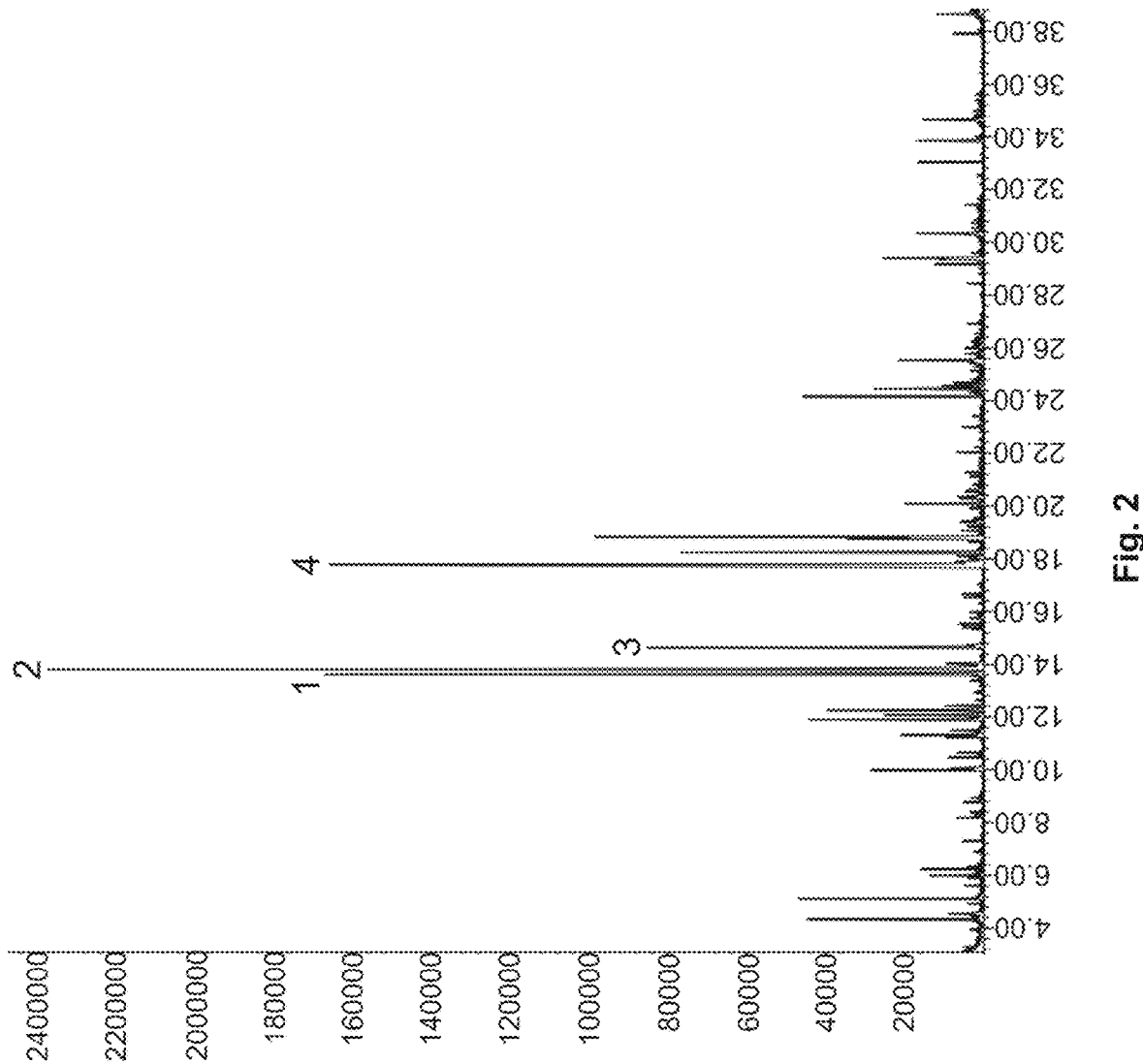
FIG. 2. Chromatographic profile of volatile compounds present in the female kiwifruit flowers (*A. chinensis*). The major compounds are: 1: nonanal, 2: phenylethanol, 3: pentanedioic acid, dimethyl ester, 4: [1,1'-bicyclopentyl]-2-one.

In recent years, pollination with honeybee hives in kiwifruit crops has gained substantial ground due to the higher yield obtained in the harvest of fruits.

The presence of honeybee hives near kiwifruit plants since the onset of flowering favors the increase in the number of fertilized flowers and, consequently, an increase in the number of fruit-sets, which results in a larger number of fruits obtained.

For these reasons kiwifruit producers hire pollination services from beekeepers in the hive transhumance business, by renting from them a certain number of beehives for the length of the flowering period. In this context and given that beekeepers normally stimulate their hives with sugar solutions, the application of a composition containing the synthetic kiwifruit formulation represents no meaningful change in beekeeping practices. When beekeepers perform transhumance with their hives during that period, bees from those colonies experience delays in starting to visit novel flowers. Therefore, establishing "memories of a synthetic formulation that mimics the fragrance of kiwifruit" within the hives would help reduce the delays in starting the collection of this crop and make pollination more efficient.

Therefore, it is an object of this invention to provide a formulation that mimics the natural scent of kiwifruit flowers in order to prompt bees to start the immediate collection in kiwifruit crops. Said formulation comprises the compounds farnesene, 1-heptadecene and 2-phenylethanol. Specifically, this formulation increases the bees' collection activity, by attracting them in a specific manner to kiwifruit flowers, promoting pollination and, consequently, increasing crop yields.

Unless specified otherwise, the percentages of the components of the formulations of the present invention correspond to volume/volume percentages (% v/v).

Although the percentage composition of compounds farnesene, 1-heptadecene and 2-phenylethanol in the formulation of the invention may vary, provided that all three compounds are present, it is preferred that 1-heptadecene be the most abundant compound, followed by farnesene, and then by 2-phenylethanol, the latter being the least abundant compound in the formulation. Preferably, 1-heptadecene is present in a percentage between 45% and 65%, more preferably between 50% and 60%. Preferably, farnesene is present in a percentage between 25% and 45%, more preferably between 30% and 40%. Preferably, 2-phenylethanol is present in a percentage between 5% and 25%, more preferably between 10% and 20% 2-phenylethanol. In the preferred embodiment of the invention, the formulation that mimics the floral scent of kiwifruit comprises 50% 1-heptadecene, 40% farnesene, and 10% 2-phenylethanol. In addition, in this patent application the terms "1-heptadecene", "farnesene" and "2-phenylethanol" comprise both the compounds themselves and any compounds derived therefrom.

Surprisingly, inventors herein have found that although the formulation of the invention combines only two of the six main volatile compounds identified in the kiwifruit floral extract of *Actinidia deliciosa* (see Example 1) with a third compound absent from said extract (1-heptadecene), bees cannot differentiate between (confuse) the natural scent of the kiwifruit flower of *A. deliciosa* and that of the formulation of the invention. This is particularly unexpected taking into account that 2-phenylethanol occupies the sixth place in percentage abundance in the kiwifruit male flower extract (although female flowers show a greater variability) whereas, as mentioned, the extract does not contain 1-heptadecene but 8-heptadecene, a similar compound whose double bond is in another position.

Composing the formulation of the present invention with 1-heptadecene, instead of 8-heptadecene as naturally found in kiwifruit floral extract, has as an advantage the fact that the compound used is easily commercially accessible, which does not happen with 8-heptadecene. Therefore, the surprising observation that the compound present in the kiwifruit flower natural extract can be replaced with another, more easily obtainable compound is clearly an unexpected and additional advantage of the invention.

Even more surprisingly, the present inventors have found that, despite that only one of the volatile compounds comprised in the formulation of the invention was identified in significant amounts in the kiwifruit floral extract of *Actinidia chinensis* (2-phenylethanol, see Example 1), bees also cannot discriminate (confuse) between the scent of the natural floral fragrance of kiwifruit of *A. chinensis* and the formulation of the invention.

Therefore, the formulation of the present invention exhibits the advantageous and surprising effect of resulting indistinguishable for bees both with respect to *A. deliciosa* and *A. chinensis*, despite them exhibiting significantly different profiles of volatile compounds (see Example 1). Correspondingly, throughout this description, the terms "kiwifruit", "kiwifruit plant", "kiwifruit crop", and the like, must be interpreted as referring generically to any variety of the kiwifruit plant, in particular both to varieties of *A. deliciosa* and to varieties of *A. chinensis*.

In addition, field trials also show that beehives which were fed a composition comprising the formulation of the invention, which is also an object of the present application, show greater collection activity in kiwifruit crops than control beehives, as well as better nutrition and population condition. On the other hand, kiwifruit crops pollinated by said beehives experience a significant increase in their yield.

The fact that an improvement is observed in the nutrition and population status of the beehives is particularly surprising. The document by Jay et al. mentions on page 506:

"Colonies of honeybees are often moved into kiwifruit orchards to assist in the pollination process. In general, bee populations decrease while the colonies are in these orchards despite being fed sugar syrup (this is done because kiwifruit flowers produce no nectar). It is also possible that the large amounts of pollen that are collected by the bees from female flowers (eg, Donavan, 1983; Jay and Jay, 1984; Goodwin, 1987) contribute to population declines in the colonies because, according to this study, the pollen appears to be of low nutritional value."(Jay et al. (1993). The effect of kiwifruit (*Actinidia deliciosa* A Chev) and yellow flowered broom (*Cytisus scoparius* Link) pollen on the ovary development of worker honeybees (*Apis mellifera* L). Apidologie 24, p557-563).

Correspondingly, the observation that the formulation of the invention improves the nutrition and population status of the beehives (see Example 4) was totally unexpected and surprising. Under no pretense of establishing a specific hypothesis, the obtained results can be explained because the food circulating inside the beehive, which is scented with the formulation of the invention, provides food resources containing specific olfactory cues, which are learned and guide the collecting individuals' searching behavior.

According to the method of the invention, the formulation of the invention can be added to the beehive before or during hives' placement in the kiwifruit crops by using methodologies of common use and known to beekeepers. The formulation of the invention can be introduced to the beehive as part of a composition, which is also an object of the present invention, in which the formulation is diluted at a concentration in the range of 0.1 to 0.2 ml of formulation per liter of a 50% w/w solution of sugar in water. Even more preferably, the composition of the invention comprises 0.1-0.2 ml of a formulation comprising 50% 1-heptadecene, 40% farnesene and 10% 2-phenylethanol, diluted in a 50% w/w sucrose solution. The composition of the invention promotes the targeted pollination by honeybees towards kiwifruit crops.

Regarding the form of administration to the beehive, the formulation (as part of, namely, a composition as the one described above) can be placed into an artificial feeder inside the beehive. Alternatively, between 500 and 1000 ml of the sugar composition can be poured directly over the frames of the beehive with bees. Eventually, a second application may be carried out based on the condition of the beehives and the crop. Particularly, when flowering periods are very prolonged, a second application may optionally be carried out to obtain greater benefits.

Correspondingly, it is another aspect of this invention to provide a method for promoting targeted pollination by honeybees towards kiwifruit crops, wherein said method comprises the steps of:

a) administering the composition of the invention to the beehives;

b) keeping the beehives within or in the immediate vicinity of the kiwifruit crop whose pollination is sought to be promoted until the end of the flowering period; and c) removing the beehives.

According to a particular embodiment of the method of the invention, step a) is carried out by placing an artificial feeder into the beehive.

According to a particular embodiment of the method of the invention, step a) is carried out by pouring between 500 and 1000 ml of the sugar composition directly over the frames of the beehive with bees.

According to another particular embodiment of the method of the invention, step a) is carried out within 2 days prior to placing the beehives into the crop whose pollination is sought to be promoted.

According to another additional particular embodiment of the method of the invention, step a) is carried out after placing the beehives into the crop whose pollination is sought to be promoted.

According to yet another additional particular embodiment of the method of the invention, step a) is carried out before the flowering level of the crop has reached 20%.

According to yet another additional particular embodiment of the method of the invention, during step b) a second administration of the composition to the beehives is carried out.

The addition of the formulation of the invention, in association with a sugar syrup, before or during installation of the beehives in the kiwifruit crops, promotes a quick and sustained collecting activity on the crop, as well as a greater general collecting activity. This simple stimulation method facilitates pollination of kiwifruit crops and demands a fewer number of beehives to be used. Additionally, the formulation of the invention has low production and marketing cost.

Unlike the commercial products POLLINUS® and BEE SCENT®, which produce innate responses in the bee's behavior, the formulation of the invention does not induce "rigid" responses in the bee's behavior (which could be counter-productive in cases in which the same beehives are moved from a given crop to a different one). On the contrary, it influences the decision-making processes, which are flexible and adjustable to the needs of each hive or to changing conditions of the environment. This is essential when pursuing an integrated management of beekeeping and agriculture where generating benefits for one of the activities is not detrimental to the other.

Thus, the formulation of the invention can be used in small quantities in order to stimulate the beehive. In addition, it is a simple formulation comprising only three volatiles related to the many volatiles composing the kiwifruit floral fragrance, making it an inexpensive, easy to produce product which is easy to use. In addition, the formulation prompts immediate collection in kiwifruit crops. Stimulation via administration of the formulation or the composition of the invention can be carried out before moving the bees to the crop and even before the onset of the flowering period of said plant species.

EXAMPLES

Example 1

Identification and Wuantification of Volatile Compounds of Kiwifruit Flowers of *A. deliciosa* and *A. chinensis*

For the identification and quantification of the volatile compounds present in kiwifruit flowers *A. deliciosa* and *A. chinensis*, the following protocol was followed:

In the kiwifruit crop of *A. deliciosa*, during the flowering period, a branch containing fresh, recently-opened flowers, was selected. Along with an odor trap, this branch was isolated using a polyethylene bag (the usual oven cooking bag) preventing from harming the plant tissue. The odor trap is a small device consisting of a glass column (Pasteur pipette) containing 100 mg of a particular adsorbent polymer inside (HayeSep Q 80-100 mesh). A small hose is connected to said glass column, which is in turn connected to an air sampling pump with a flow rate of 1 liter/hour. After more than 5 hours of collection (depending on the crop, collection periods varied from 5 to 8 hours), the glass column was removed and eluted (washed) with 2 ml of hexane in a small glass vial and stored in a freezer for subsequent analysis in a GC-MS (gas chromatography-mass spectrometer, Shimadzu QP-2010). This procedure was carried out considering female flowers of the "Hayward" variety as well as male flowers of the "Chico malo", "Tomuri", "Chiften" and "Matua" varieties.

The same procedure for sampling and extraction of volatile compounds was applied to kiwifruit flowers of *A. chinensis*, only varying the collection time (3 h) and the volume of hexane used in the elution of the glass columns of the odor traps (1 ml).

In the laboratory, 1 microliter of each sample was injected into the GC-MS. Conditions of the chromatograph were as follows: injector method: Splitless, with helium as carrier gas; an injection temperature of 250° C. and an interface temperature of 310° C. The temperature ramp used was: 40 (1)-5-200-15-300 (1); and the column: AT-5 (diameter=0.25 mm, length=30 m, film=0.25 mm, flow=1 ml/min).

For identification of the volatile compounds present in the samples, libraries NIST05, NIST08 and SHIM2205 were used.

Table 1 shows the retention time and peak area for the 6 main compounds identified in the male flower of *A deliciosa*.

TABLE 1

Main compounds identified in the male kiwifruit flower extract of *A. deliciosa*

| Peak No | Retention time (min) | Peak area (%) | Identified compound |
|---|---|---|---|
| 1 | 10.89 | 9.07 | 2-phenylethanol |
| 2 | 18.38 | 9.96 | pentadecane |
| 3 | 18.58 | 17.48 | Farnesene |
| 4 | 21.25 | 12.31 | Heptadecadiene |
| 5 | 21.36 | 15.99 | 8-heptadecene |
| 6 | 21.68 | 4.41 | eicosane/heptadecane/ heneicosane/hexadecane |

Table 2 shows retention time and peak area for the 6 main compounds identified in the female flower of *A. deliciosa*.

TABLE 2

| | Main compounds identified in the female kiwifruit flower extract of *A. deliciosa*. | | |
| Peak No | Retention time (min) | Peak area (%) | Identified compound |
|---|---|---|---|
| 1 | 10.88 | 6.86 | 2-phenylethanol |
| 2 | 18.38 | 8.85 | Pentadecane |
| 3 | 18.60 | 28.95 | Farnesene |
| 4 | 21.24 | 9.17 | Heptadecadiene |
| 5 | 21.35 | 12.79 | 8-heptadecene |
| 6 | 21.68 | 5.07 | eicosane/heptadecane/ heneicosane/hexadecane |

Table 3 below provides greater detail regarding major and minor compounds identified for the female and male flowers of *A. deliciosa* and *A. chinensis* in the different sampled locations.

TABLE 3

Compounds present in male and female kiwifruit flowers of *A. deliciosa* and *A. chinensis*-x means presence of the compound, M means that it is a major compound, tr means that the compound appears in small traces

| | *A. deliciosa* | | | | *A. chinensis* | |
| | Female | | Male | | Male | Female |
| Compound | Navarro | Miramar | Navarro | Miramar | US | US |
|---|---|---|---|---|---|---|
| 4-methyloctane | no | no | no | no | tr | tr |
| Limonene | no | no | no | no | tr | tr |
| Butanedioic acid dimethyl ester | no | no | no | no | tr | tr |
| 1,2-diethylbenzene | no | no | no | no | x | x |
| 1,3-diethylbenzene | no | no | no | no | no | x |
| 1,4-diethyl-benzene | no | no | no | no | x | x |
| Alpha-pinene | no | no | x | no | no | no |
| Sabinene | no | no | x | no | no | no |
| 6-methyl-5 hepten-2-one | x | x | x | x | tr | x |
| 2-ethyl-1-hexanol | no | no | no | no | tr | tr |
| Octanal | no | x | x | x | tr | tr |
| Hexenyl acetate (cis/trans) | x | x | x | x | x | no |
| Hexyl acetate | x | x | x | x | no | no |
| Tetradecane | x | x | x | x | no | no |
| Nonanal | x | x | x | x | M | M |
| Phenylethanol | M | M | M | M | M | M |
| Pentanedioic acid, dimethyl ester | no | no | no | no | M | M |
| Methyl salicylate | no | no | no | no | no | tr |
| Hexanedioic acid, dimethyl ester | no | no | no | no | x | tr |
| 1-(4-ethylphenyl)-ethanone | no | no | no | no | x | x |
| [1,1'-Bicyclopentyl]-2-one | no | no | no | no | M | M |
| Oxoisophorone | x | x | x | x | no | no |
| Decanal | x | tr | x | x | no | no |
| Phenylethyl acetate | x | x | x | x | no | no |
| Jazmone E/Z | x | x | x | x | no | no |
| Germacrene | tr | tr | x | x | no | no |
| Pentadecane | M | M | M | M | tr | tr |
| 4-(2,6,6-trimethyl-1-cyclohexen-1-yl)-3-buten-2-one | no | no | no | no | tr | x |
| Alpha-farnesene | M | M | M | M | no | tr |
| Heptadecadiene | M | M | M | M | tr | tr |
| 8-heptadecene | M | M | M | M | no | no |
| Homosalate | no | no | no | no | tr | no |
| Homomenthyl salicylate | no | no | no | no | M | tr |
| Eicosane/heptadecane/heneicosane/ hexadecane | M | M | M | M | tr | tr |
| Eicosane/docosene/1-nonadecene/9-tricosene | x | x | x | x | tr | tr |
| Heptadecane/hexadecane/eicosane/ octacosane/heneicosane | x | x | x | x | tr | tr |

Example 2

Preparation of Formulations 7 different mixtures were prepared, in each of which 2 or 3 of the volatile compounds identified in Example 1 were combined. The formulations comprising only two of the identified compounds additionally comprise 1-heptadecene as a third component. The composition in each one of the mixtures was:

Mixture I: 30% Farnesene, 30% Nonanal, 40% 2-phenylethanol.

Mixture II: 50% Farnesene, 10% Nonanal, 40% 2-phenylethanol.

Mixture III: 30% Farnesene, 30% 1-heptadecene, 40% 2-phenylethanol.

Mixture IV: 30% Farnesene, 50% 1-heptadecene, 20% 2-phenylethanol.

Mixture V (particularly preferred formulation of the invention): 40% Farnesene, 50% 1-heptadecene, 10% 2-phenylethanol.

Mixture VI: 30% Farnesene, 60% 1-heptadecene, 10% 2-phenylethanol.

Mixture VII: 40% Farnesene, 45% 1-heptadecene, 15% 2-phenylethanol.

In all cases, pure Sigma-Aldrich® compounds with purity over 95% were used. Solutions were prepared at room temperature, combining the compounds, without the use of solvents. Once the solutions were prepared, mixtures were immediately used in the experiment and stored at 2-8° C. until the end of the assays period (4 days).

Example 3

Evaluation of Mixtures Via Absolute Olfactory Conditioning

Absolute olfactory conditioning was carried out using the proboscis extension response protocol (PER protocol). For this purpose, bees were collected at the beehives entrance, anesthetized and subsequently harnessed in such a manner that their mouthparts and antennae could move freely. During conditioning, bees are trained to associate a determined olfactory stimulus (conditioned stimulus: in this case, some of the stated mixtures) with a reward (unconditioned stimulus: in this case, a sugar solution). Once training was finalized, bees were presented with the natural scent of kiwifruit flowers of *A. deliciosa* (female and male, tested separately) and it was recorded whether or not they extended the proboscis, which would mean they mistook or not, respectively, the scent for the taught mixture.

Figure 4:
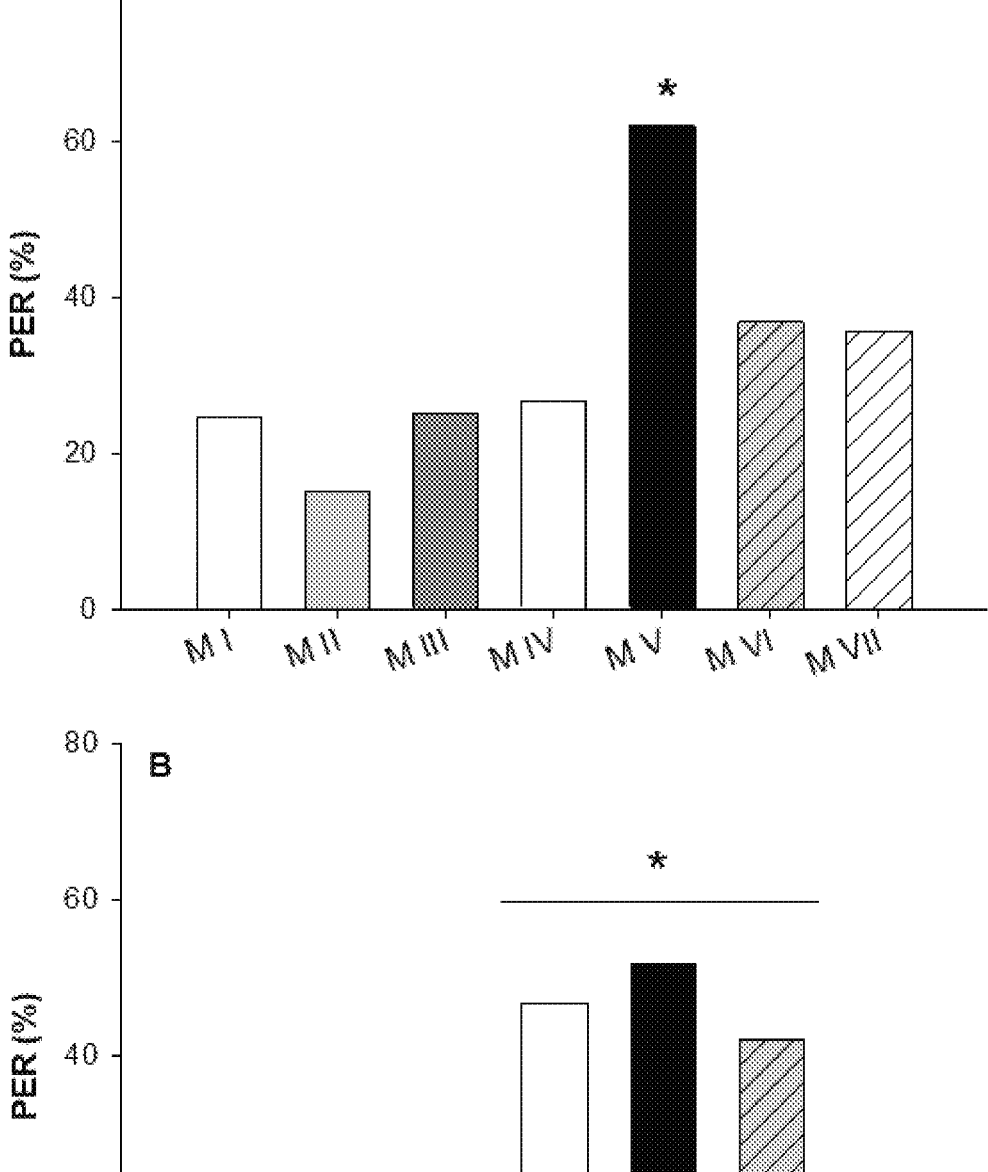
FIG. 4. Results of Absolute Olfactory Conditioning experiments. The upper panel (A) shows the ratio of bees that extended their proboscises (PER %) in the presence of the female flower, after undergoing training with some of the different mixtures tested, in Absolute Olfactory Conditioning, a procedure under which harnessed bees must learn to associate an odor (in this case, any of the mixtures) with the reward (50% w/w Sugar Solution). The lower panel (B) shows the percentage of bees that extended their proboscises (PER %) in the presence of the male flower, after being trained with some of the mixtures.

At the end of the conditioning period, bees could differentiate the natural scent of the kiwifruit female flowers of *A. deliciosa* from all the evaluated scents, except for mixture V. In the male flowers assay, bees could not differentiate the natural scent of the kiwifruit flowers of *A. deliciosa* from the scent of mixtures IV, V and VI (FIG. 4).

Example 5

Evaluation of Mixtures Via Differential Olfactory Conditioning

Figure 5:
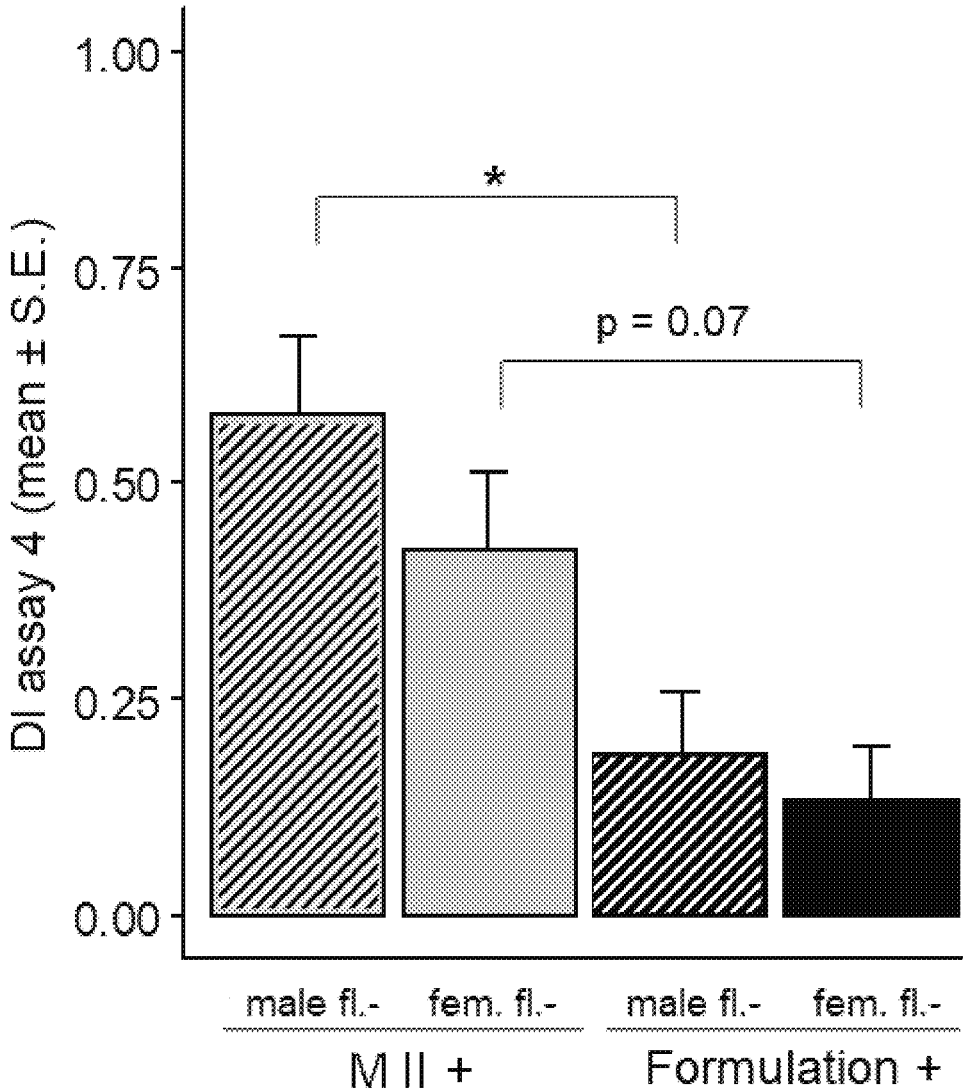
FIG. 5. Results of Differential Olfactory Conditioning experiments. During training, either Mixture II or Mixture V associated with a reward (+), and extracts from male or female kiwifruit flowers without reward (−) were presented. The discrimination index (DI) represents the difference between the response to the rewarded scent minus the response to the unrewarded scent in the last training assay. The asterisk represents a significant difference between the treatments with p<0.05.

A Differential Olfactory Conditioning Protocol was carried out (Bitterman, M. E., Menzel, R., Fietz, A., & Schafer, S. (1983). Classical conditioning of proboscis extension in honeybees (*Apis mellifera*). *Journal of comparative psychology*, 97(2), 107), to evaluate the capability of the bees to discriminate between a candidate mixture and the natural scent of kiwifruit flowers of *A. deliciosa*. During training, the candidate mixture (Mixtures II or V) associated with a reward and extracts of male or female kiwifruit flowers without reward were presented. Then, a discrimination index (DI) was calculated as the difference between the response to the rewarded odor minus the response to the unrewarded odor in the last training assay. In FIG. 5 the DI obtained is shown (mean value±standard error) for the different evaluated mixtures. It is observed that those bees trained with rewarded Mixture V exhibited a lower olfactory discrimination capability than the bees trained with rewarded Mixture II respect to the unrewarded floral odors of kiwifruit (for male flower: p=0.01; for female flower: p=0.07; GLMM).

Example 5

Beehive Stimulation

Before stimulation, all hives were inspected in order to use only those with similar population levels. 62 hives were selected out of the total number of hives for the assignment of the following treatments:

Treated Group: beehives fed with sugar solution with mixture V (n=30 beehives)

Control group: beehives fed with sucrose solution (n=32 beehives)

Each beehive was stimulated only once with 500 ml of solution.

Once the beehives had been stimulated, pollen traps were placed in the beehive entrances to discriminate and quantify the type of pollen introduced by foraging bees by placing the hives in proximity to a kiwifruit crop of *A. deliciosa*. Depending on the crop, this procedure was repeated every day in the morning (10:00-12:00 a.m.) and in the afternoon (12:30-16:30), on the days following stimulation, on a total number of 12 beehives. Then, the harvested pollen was analyzed in the laboratory, where the number of kiwifruit pollen loads (white color pollen, contrasted with samples of stamens of kiwifruit flowers) and the dry weight were recorded.

Additionally, in order to evaluate the development of the stimulated beehives, the uncapped brood area (not sealed) and the pollen area were measured in two moments: the day before the application of treatments and 7 days later (n=10 beehives/treatment). Thus, for each beehive, a total uncapped brood area and a total pollen area, both initial and final, were obtained to then calculate the difference and thus obtain their development.

Lastly, in order to evaluate the effect of hive stimulation in the crop yield (50 hives in total, 25 per treatment), the flowers present in 25-30 plants/treatment in proximity to the stimulated beehives were marked and quantified. Later, during harvest, the number of fruits in the marked branches was counted to then calculate the ratio of the number of fruits to the number of flowers.

Figure 3:
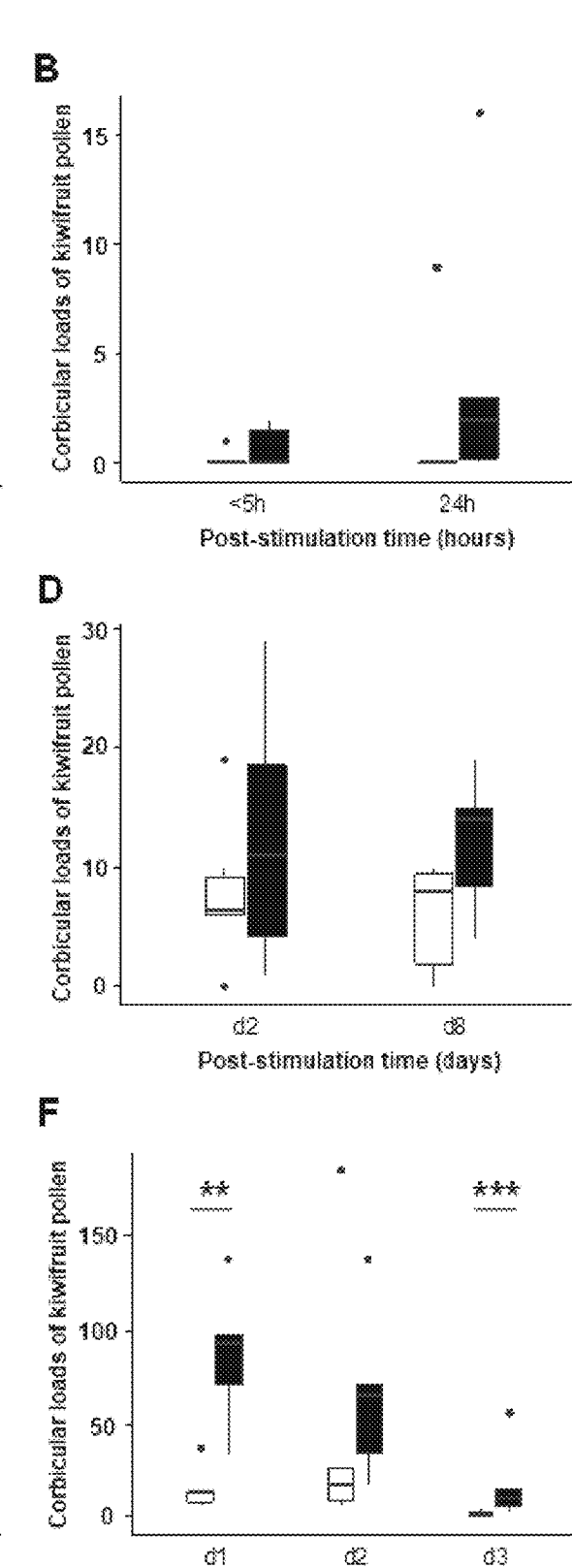
FIG. 3. Food collection of the beehives. The entry of kiwifruit pollen into the beehives was quantified by means of pollen traps placed in two sets of beehives under the following treatments: (i) Control Group: beehives fed with 500 ml of sucrose solution in a single dose (white color); (ii) Treated Group: beehives fed with 500 ml of sucrose solution, with the addition of Mixture V (black color). In (A), (C) and (E) the dry weight (g), and in (B), (D) and (F) the number of corbicular kiwifruit pollen loads as a function of the post-stimulation time are shown. In all cases 6 hives per treatment were used. The data were collected from a crop located near Miramar (Province of Buenos Aires) in 2018 (A and B), and from a crop located near Navarro (Province of Buenos Aires) in 2019 (C and D) and 2021 (E and F). Asterisks represent significant differences between treatments (*, p<0.05; , p<0.01; *, p<0.001).
Figure 6:
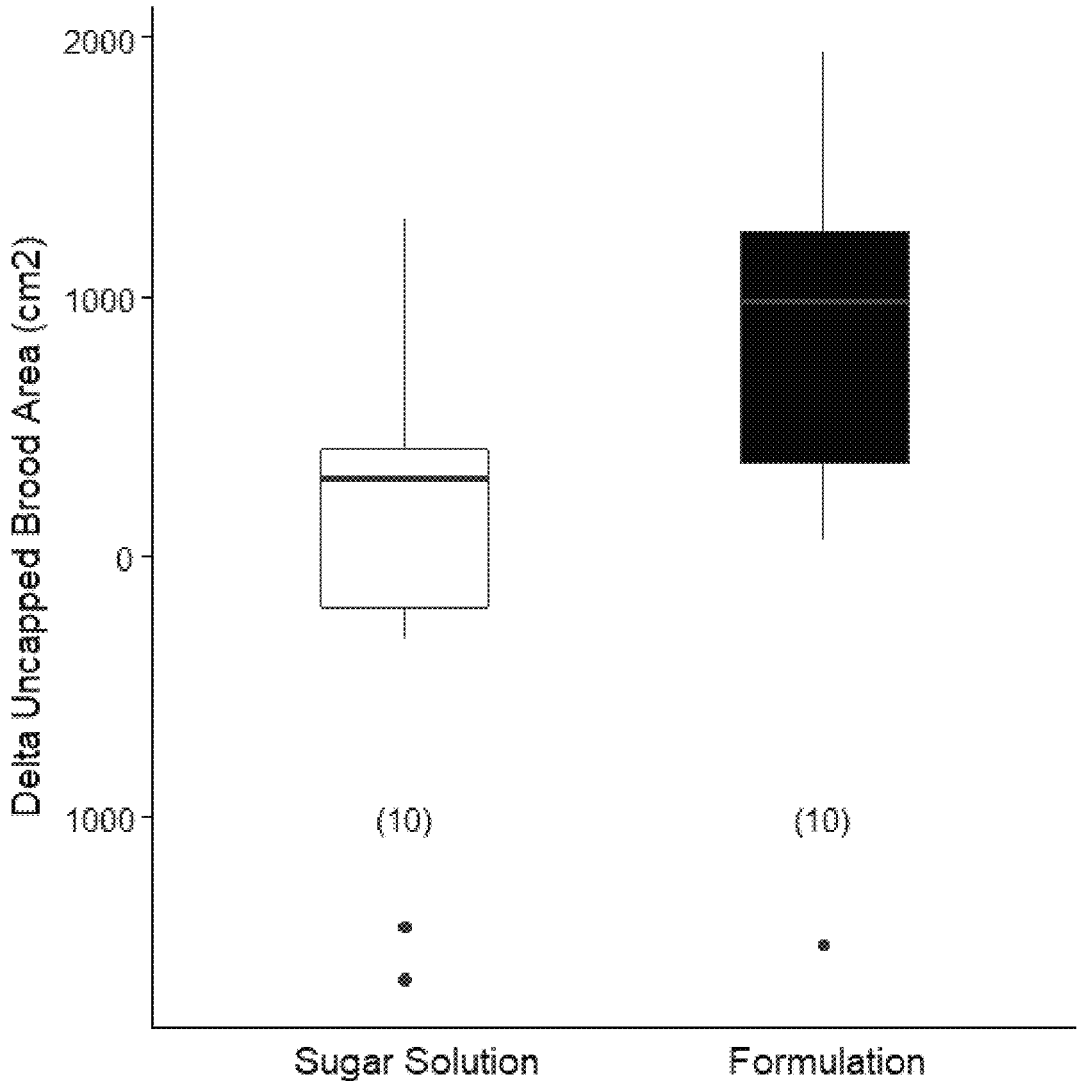
FIG. 6. Increase of beehive population. The growth of the brood area was calculated in two sets of hives: (i) Control Group: beehives fed with 500 ml of Sucrose Solution (white color) in a single dose; (ii) Treated Group: beehives fed with 500 ml of Sucrose Solution with the addition of Mixture V (black color). The total uncapped brood area of beehives was estimated by adding up the brood areas on both sides in all frames. Uncapped brood is an indicator that eggs were laid after stimulation. The number of beehives is indicated between brackets. The data were collected in crops located near Navarro (Province of Buenos Aires) in 2019.

Increased bee activity in the treated beehives had a correlation with a greater pollen area (FIG. 3), and with higher increase in beehive population (FIG. 6), showing that the sugar composition with Mixture V promotes greater food collection and stimulates beehive growth.

Figure 7:
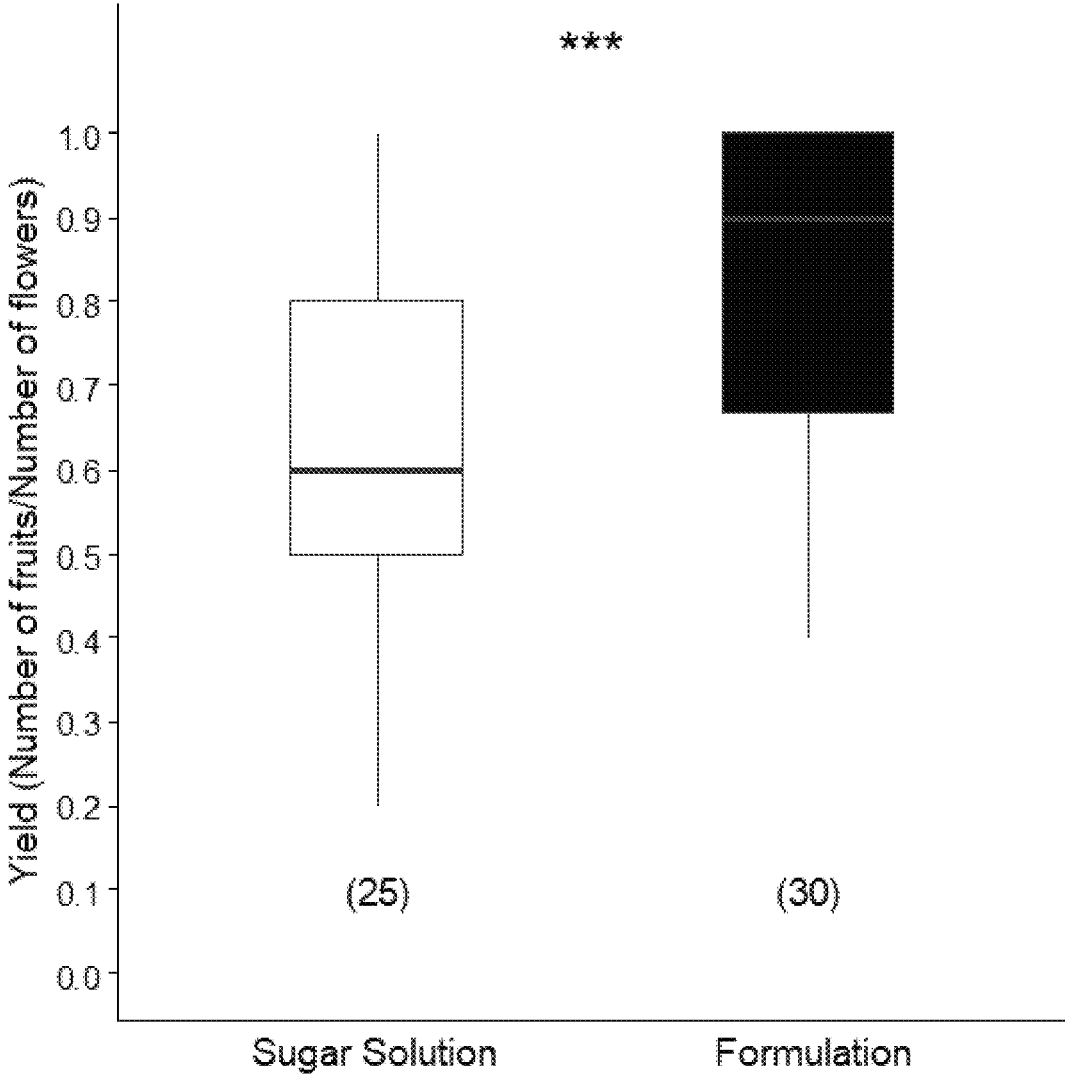
FIG. 7. Crop yield. Yields were measured in environments near beehives subjected to two treatments: (i) Control Group: beehives fed with 500 ml of Sucrose Solution (white color) in a single dose; (ii) Treated Group: beehives fed 500 ml of Sucrose Solution with the addition of Mixture V (black color). The ratio of the number of fruits to the number of flowers is shown. The data were collected in crops located near Mar del Plata (Province of Buenos Aires) in 2019. Asterisks represent significant differences between treatments (p<0.001).

Beneficial effects on kiwifruit crops were also verified. Kiwifruit crops in proximity to the beehives treated with sugar composition with the addition of the formulation of Mixture V had a higher yield measured in terms of fruits per flower (FIG. 7).

What is claimed is:

1. A formulation that promotes targeted pollination by honeybees towards kiwifruit crops, wherein said formulation comprises between 25 and 45% v/v of farnesene, between 45 and 65% v/v of 1-heptadecene, and between 5 and 25% v/v of 2-phenylethanol.

2. The formulation according to claim 1, wherein the formulation comprises between 30 and 40% v/v of farnesene, between 50 and 60% v/v of 1-heptadecene and between 10 and 20% v/v of 2-phenylethanol.

3. The formulation according to claim 1, wherein the formulation comprises 40% v/v of farnesene, 50% of 1-heptadecene and 10% v/v of 2-phenylethanol.

4. A composition that promotes targeted pollination by honeybees towards kiwifruit crops, wherein said composition comprises a formulation comprising between 25 and 45% v/v of farnesene, between 45 and 65% v/v of 1-heptadecene and between 5 and 25% v/v of 2-phenylethanol, diluted in a sugar solution.

5. The composition according to claim 4, wherein the sugar solution is a 50% w/w solution of sucrose in water.

6. The composition according to claim 5, wherein the composition comprises between 0.1 and 0.2 ml of a formulation comprising the compounds farnesene, 1-heptadecene and 2-phenylethanol per liter of 50% w/w solution of sucrose in water.

7. The composition according to claim 6, wherein the composition comprises between 0.1 and 0.2 ml of a formulation comprising 50% v/v of 1-heptadecene, 40% v/v of farnesene and 10% v/v of 2-phenylethanol per liter of 50% w/w solution of sucrose in water.

8. A method for promoting the targeted pollination by honeybees towards kiwifruit crops, wherein said method comprises the steps of:

a) administering the composition of claim 4 to beehives;

b) keeping the beehives within or in the immediate vicinity of the kiwifruit crop whose pollination is sought to be promoted until the end of the flowering period; and c) removing the beehives.

9. The method according to claim 8, wherein step a) is carried out via an artificial feeder located inside the beehive.

10. The method according to claim 8, wherein step a) is carried out within two days prior to moving the beehives to the crop whose pollination is sought to be promoted.

11. The method according to claim 8, wherein step a) is carried out after the introduction of the beehives to the crop whose pollination is sought to be promoted.

12. The method according to claim 11, wherein step a) is carried out before a flowering level has reached 20%.

13. The method according to claim 8, wherein during step b) a second application of the composition is administered to the beehives.

* * * * *